Sept. 19, 1950     W. A. WEBB     2,523,080
CAN DRYING APPARATUS
Filed Aug. 5, 1947     3 Sheets-Sheet 1
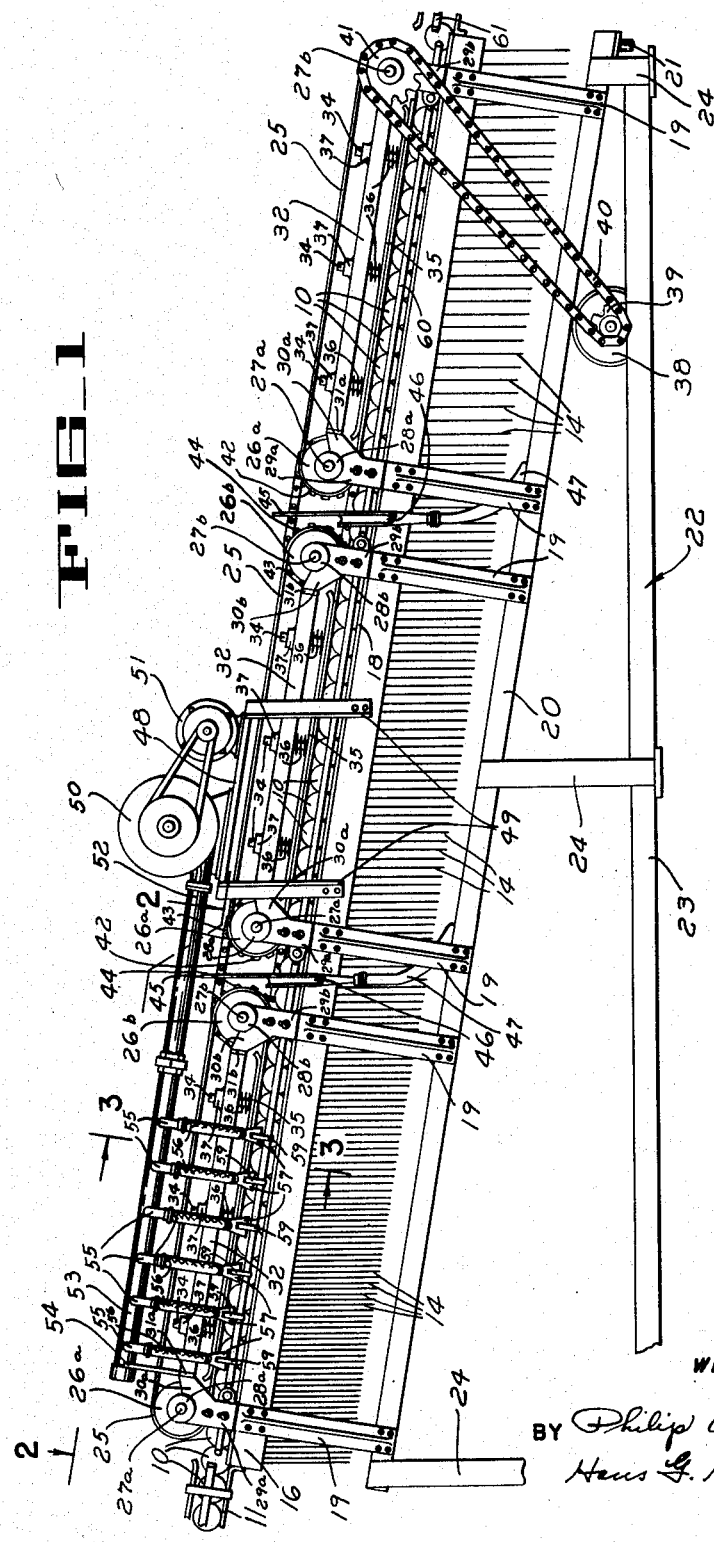
INVENTOR
WELLS A. WEBB.
BY Philip A. Minnis
Hans G. Hoffmeister.
ATTORNEYS

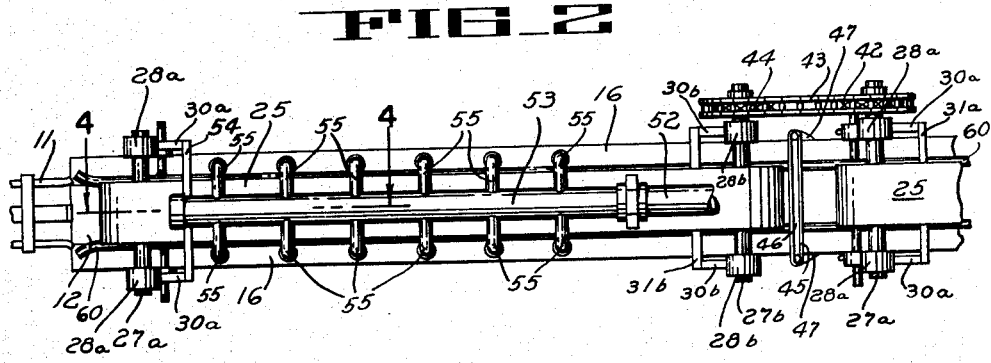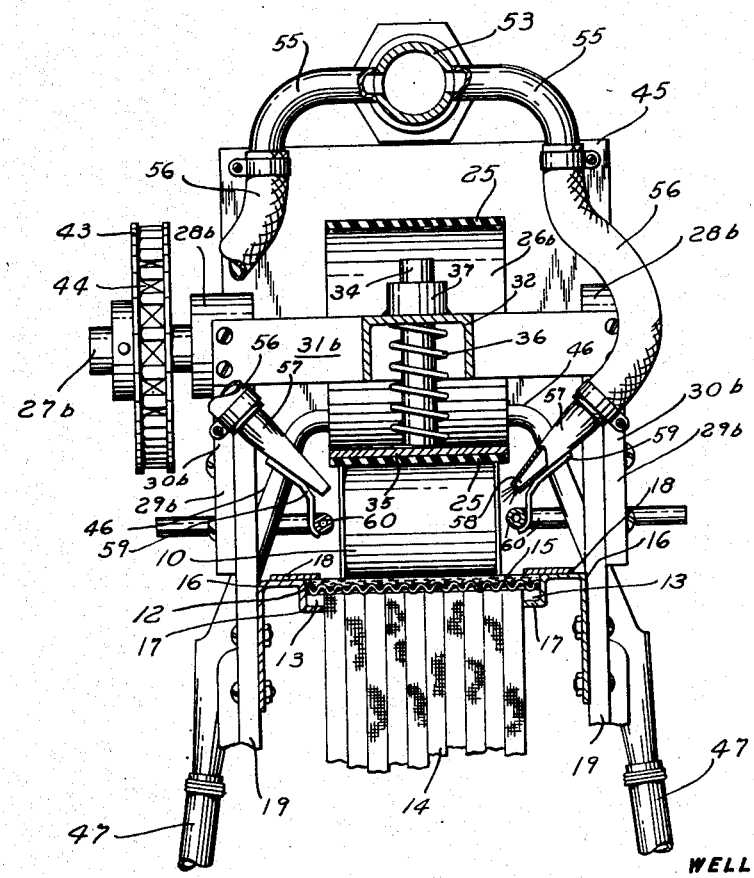

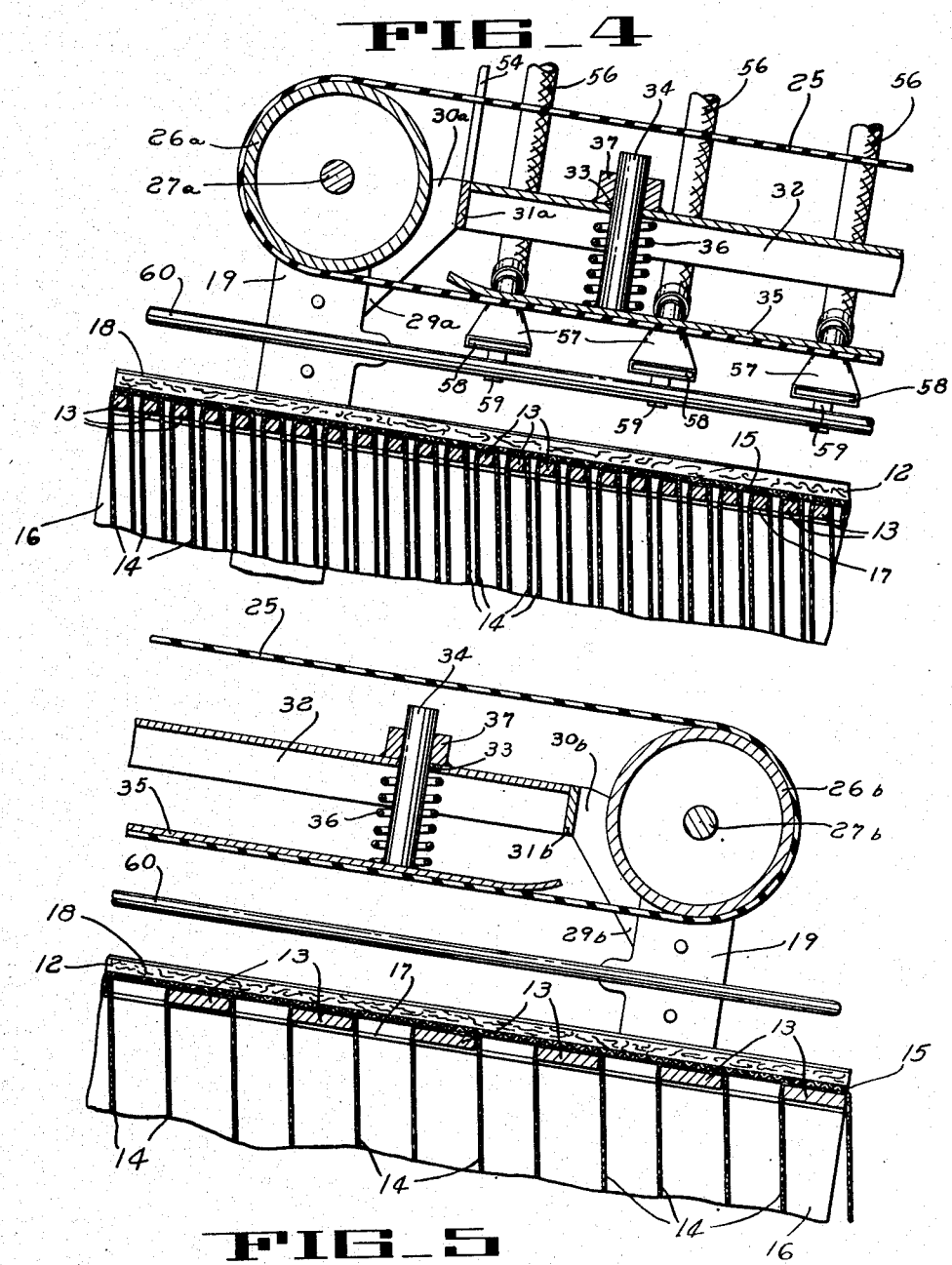

Patented Sept. 19, 1950

2,523,080

UNITED STATES PATENT OFFICE 2,523,080

CAN DRYING APPARATUS

Wells A. Webb, San Jose, Calif., assignor to Food Machinery and Chemical Corporation, a corporation of Delaware Application August 5, 1947, Serial No. 766,296

8 Claims. (Cl. 34—71)

The present invention relates to an apparatus for automatically drying containers, especially those employed to hold food products and commonly known as cans.

Cans of this type, when filled with food products and sealed, are usually subjected to a sterilization process involving the application of high temperatures and require subsequent cooling with water or other cooling liquids. It is then necessary that the cans be dried to avoid rusting and to permit labelling and packing thereof without undue delay.

It has heretofore been customary to subject the moist cans to currents of heated air. However, aside from the considerable expenditure in fuel and power required to produce hot air currents of sufficient strength and volume for drying large quantities of cans, it is not permissible with a variety of products such as the juices of citrus fruit that the cans, once cooled, be again subjected to temperature increases if the flavor of the products is to be preserved.

One object of the present invention is to provide an improved apparatus for drying containers.

Another object is to provide an apparatus which will speedily dry containers without subjecting them to an increase in temperature.

It is another object of the invention to furnish an apparatus of the type referred to which is of small compass and requires a minimum in operating cost.

Other objects and advantages of the present invention will be apparent from the following description and drawings in which:

Fig. 1 is a side elevation of the can drying apparatus of the present invention.

Fig. 2 is a plan view of the front end of the apparatus.

Fig. 3 is a cross-sectional view of the apparatus taken along line 3—3 of Fig. 1.

Fig. 4 is a longitudinal section of the front end of the machine taken along line 4—4 of Fig. 2.

Fig. 5 is a longitudinal section of the discharge end of the machine.

Referring to Fig. 1, a procession of cylindrical cans 10 rolls or slides from an inclined supply chute 11 onto a slanting surface 12 formed by an elongated pad of an absorbent material such as felt of fur, asbestos, felted glass threads, or other fibrous matter. The pad 12 is supported by a plurality of transverse bars 13 which are spaced from one another and over each of which is folded a sheet of material 14 having its opposite ends depending vertically at either side thereof, as shown in Figs. 3, 4, and 5. These sheets consist of materials that have capillary properties such as strips of cloth, wire netting, opposing sand blasted metal surfaces, etc. A screen 15 may be interposed between the pad 12 and the upper surfaces of the bars 13 to give support to pad 12 in the intervals between the individual bars.

The pad 12 is flanked by two parallel plates 16, the upper ends of which are turned inwardly and form a pair of depressed parallel lips 17 upon which are supported the opposite ends of the transverse bars 13, as may best be seen from Fig. 3. Cover plates 18 may be provided to dependably retain the bars 13, the grid 15, and the pad 12 in their proper positions.

The plates 16 are held in position by six pairs of rearwardly tilted standards 19, as shown in Fig. 1. The upper ends of these standards project a short distance beyond the plane of the capillary pad 12 (Fig. 3) while their lower ends are secured to the side walls of an inclined trough or gutter 20 extending all the way from the supply end of the described arrangement to the discharge end thereof and having a discharge spout 21 at its lower end (Fig. 1). The trough 20 rests upon a pedestal 22 comprising a pair of horizontally positioned parallel base bars 23 and several pairs of uprights 24 of successively decreasing height.

Disposed above pad 12 is a sequence of three endless belts 25, of canvas or rubber, each trained around an upper and lower drum or pulley 26a and 26b, respectively, and arranged to present a parallel run to the inclined surface of the pad a distance above said pad corresponding to the diameter of the cans to be dried by the apparatus of the present invention. The pulleys 26a and 26b are each mounted upon transverse shafts 27a and 27b, the ends of which are rotatably supported in pairs of bearings 28a and 28b mounted in brackets 29a and 29b which in turn are bolted to the upper ends of the standards 19, as may be seen from Figs. 1 and 3.

Means are provided in accordance with the invention to resiliently hold the lower runs of the belts 25 against the cans rolling down the inclined pad 12 underneath. For this purpose the brackets 29a at the upper end of each belt 25 are provided with arms 30a extending in the direction of movement of the cans (Figs. 1 and 4) while the brackets 29b at the lower end of each belt 25 are provided with forwardly extending arms 30b. These arms hold carrier bars 31a and 31b, respectively, which extend transversely across the path of the cans and intermediate of the parallel runs of the belts 25 (Figs. 2 and 3), to rigidly support within each of the endless belts 25 an inverted U-bar 32 extending parallel to the longitudinal runs thereof.

The horizontal surface of each U-bar 32 is provided with a plurality of apertures 33 which are slidably engaged by bolts or studs 34. A shield 35 is rigidly attached to the lower ends of the sliding studs 34, as may be seen from Figs. 3, 4, and 5, and compression springs 36, coiled around studs 34 and disposed between the rigidly mounted U-bar 32 and the upper surface of shield 35, yieldably urge the latter against the lower longitudinal run of the endless belt 25 and thus keep said run in contact with the procession of cans traveling down the inclined upper surface of the capillary pad 12 below. Each of the above mentioned apertures 33 may be reinforced by a suitable bushing 37 rigidly attached to the upper horizontal surface of the U-bar 32, so as to confine movement of the sliding studs 34 to a line perpendicular to the plane of U-bar 32.

In operation each of the belts 25 is moved in counterclockwise direction, as viewed in Figs. 1, 4, and 5 so as to aid the cans in their advance down the inclined capillary pad 12, and for this purpose a suitable motor 38 may be provided near the discharge end of the arrangement, as shown in Fig. 1. The drive shaft of this motor carries a sprocket 39 which is operatively connected by a sprocket chain 40 with another sprocket 41 keyed upon an axially extended end of the last one of the previously described shafts 27b at the discharge end of the apparatus. The rotation thus transmitted from the motor to the last of the pulleys 26b drives the belt 25, trained around said pulley, which in turn will rotate the pulley 26a and the shaft 27a at the upper end of said belt upon which said pulley is keyed. This shaft 27a is also extended in axial direction to carry a sprocket 42 which is operatively connected by a short sprocket chain 43 with another sprocket 44 keyed upon the end of the shaft 27b at the lower end of the second one in the sequence of propeller belts 25. Thus, this second belt 25 will move in counterclockwise direction as soon as motor 38 sets the last one of the belts 25 into motion. The described arrangement is repeated between the upper end of the second belt and the lower end of the first belt, as shown in Figs. 1 and 2, so that operation of the motor 38 will simultaneously turn all the belts 26 in counterclockwise direction, as viewed in Figs. 1, 4 and 5.

For aiding the cans in their downward travel along the inclined capillary pad 12 I prefer a sequence of separate belts to the use of a single belt extending over the full length of the arrangement because a belt in contact with wet cans will rapidly become wet itself and, since it travels faster than the cans, will eventually transfer moisture collected during its initial travel onto the cans further ahead. This would partly defeat the drying effect of the capillary pad and impair the efficiency of the apparatus as a whole. By dividing the propeller belt into a plurality of separate belts in the manner illustrated and described the possibility of transferring moisture from newly arriving to more advanced cans is correspondingly reduced.

Means may be provided in the form of wiper blades or wiper pads (not shown), located at suitable points of the upper horizontal runs of the belts, to remove the moisture from the belts before they come again into contact with the cans at the upper ends of their operational runs.

In order to protect succeeding belts against moisture that may be hurled from preceding belts as they turn around the pulleys 26b at their lower ends, rectangular baffle plates 45 are interposed between the adjacent ends of the belts, as shown in Figs. 1, 2, and 3. The bottom edges of these baffle plates are formed into troughs 46 which are drained by two discharge conduits 47 (Figs. 1 and 3) disposed at either side thereof and arranged to empty into the previously described gutter 20 below the absorbent sheets 14.

While the arrangement so far described will dry the cylindrical areas of the cans 10, additional means are provided in accordance with my invention to dry the end walls of the cans as well. For this purpose a platform 48 is mounted above and across the path of the cans at a suitable point longitudinally thereof (Fig. 1) such as by means of legs 49 bolted to the flanking plates 16 at either side of the pad. Supported upon the platform 48 is a blower 50 of suitable design that may be operated by a motor 51 which is likewise supported upon platform 48. The blower 50 delivers blasts of air through a suitable connector tube 52 into a manifold 53 disposed above, and parallel to, the upper horizontal run of the first one of the belts 25 and extending in the direction opposite to the direction of movement of the cans 10. The closed end of the manifold 53 is supported upon a bridge 54 which spans the belt 25 and rests upon the previously described arms 30a of the brackets 29a at the supply end of the apparatus.

The manifold 53 is provided with a plurality of branch pipes 55 arranged in pairs with the pipes of each pair branching off horizontally at diametrically opposite points of the manifold. The ends of branch pipes 55 are turned downwardly and connect with hoses 56 of flexible material such as rubber. The initial portions of these hoses are turned outwardly and transversely away from the cans 10 in order that their end portions may be returned at oblique angles relative to the can walls, as shown in Fig. 3. Nozzles 57 having slotted orifices 58 are fitted into the open ends of the hoses 56 and are held in their proper positions, with their orifices closely adjacent to the end walls of the cans and somewhat above the level of the center axes thereof, by supporting arms or brackets 59. These arms rise from guide rails 60 arranged at either side of the can procession and supported from the upper ends of the previously described standards 19.

In operation the wet cans 10 slide down the inclined supply chute 11 with their axes parallel and transverse to the direction of movement and roll onto the felt pad 12 into the space between the guide rails 60 at either side thereof. Here they are seized by the first one in the sequence of the belts 25 disposed above the pad. Due to their counterclockwise movement, these belts roll the cans down the inclined pad 12, while maintaining them in close contact with the upper surface thereof, and finally push them onto the discharge slide 61 provided at the end of the installation (Fig. 1). As the cans travel down the pad 12 in the described manner, the pad will eagerly absorb the moisture clinging to the cylindrical surfaces of the cans. As can after can passes over the pad in continuous procession the pad would normally soon reach a saturation point and no longer be capable of absorbing further moisture from the cans, but the previously described streamers of absorbent material arranged below the pad will constantly drain the pad by capillary action in the manner of wicks, and the water dripping from the ends of the streamers is collected in and carried away by the previously described trough or gutter 20 at the bottom of the arrangement. Aside from the nature of the material from which sheets 14 are made, their effectiveness in draining the pad 12 is greatly determined by the vertical length of their streamers. I have found that streamers of a length of about 12 inches will yield very satisfactory results, and will draw water from a limited area of the pad very effectively. Therefore, by providing an adequate number of sheets of the type described along the lower surface of the pad I am able to maintain the pad in proper condition to dry a continuous procession of cans rolling down its upper surface with no cost of operation such as would be required by a suction device of equal efficiency.

Evidently, the initial portions of pad 12 have to absorb a greater amount of moisture than subsequent portions thereof, since the cans will be very wet when they roll from the supply chute 11 onto pad 12 but will become progressively dryer, as they travel down the moisture-absorbing path. I, therefore, provide a greater number of wicks 14 per unit length underneath the initial portion of the pad than underneath the mid-portion or the end-portion thereof. In the preferred embodiment illustrated in Fig. 1, the density of the streamers 14 varies gradually from a region of maximum density at the supply end of the apparatus to a region of minimum density at the discharge end thereof. I have obtained very satisfactory results by making the intervals between successive streamers about half an inch wide at the input portions of my apparatus and increasing these intervals gradually to about two inches at the discharge end thereof. It will be understood, however, that the streamers may also be arranged in a sequence of sections with the streamers in each successive section being spaced greater distances apart.

In order to remove the moisture clinging to the end walls of the cans 10, the previously described motor 51 is started to operate the blower 50. This blower supplies an air blast of moderate pressure, such as from 15 to 20 inches of water, into the manifold 53 where the blast is subdivided into a plurality of individual jets, which reach the end walls of the cans through branch pipes 55, hoses 56, and nozzles 57 at an oblique angle, pointing in downward direction, and scatter the droplets clinging to the vertical walls of the cans onto the pad 12 underneath as best shown in Fig. 3. In the illustrated embodiment the nozzles 57 are arranged at angles of about 45 degrees relative to the planes of the can ends and while I have found such an angle to prove highly effective, it will be understood that satisfactory results may be obtained by arranging the nozzles at steeper or blunter angles if desired. The pad 12 will absorb and drain away the moisture received from the ends of the cans and in turn will be aided in the dissipation of moisture contained therein by the evaporating effects of the currents of air emitted from the nozzles and deflected downwardly along the vertical surfaces of the can ends. This evaporation, though relatively small, has the added advantage of cooling the can procession.

Thus the arrangement of the present invention provides thorough drying of the cylindrical surfaces of a continuous procession of containers without requiring power for the operation of a suction device or fuel for the production of heat to accelerate evaporation. Furthermore, the apparatus will dry the end walls of the cans with a minimum expenditure of power, and its method of operation is such that it lowers, rather than raises, the temperature of the cans processed therein.

It should further be noted that a single elongated blow slit may be provided at either side of the can procession to dry the end walls thereof, instead of a plurality of individual blow nozzles as illustrated and described. Also, the number of the belts 26 may be decreased or increased, to suit particular requirements.

While I have shown and described a preferred apparatus for carrying out my invention, it will be understood that said apparatus is capable of variation and modification while still employing the principles of my invention. It is to be understood, therefore, that the scope of the invention should be limited only by the scope and proper interpretation of the claims appended hereto.

Having thus described my invention, what I claim as new and desire to protect by Letters Patent is:

1. Apparatus for drying wet cans comprising a relatively thin pad of an absorbent material having an upper and a lower surface, means for rolling said cans along said upper surface and in close contact therewith, and a plurality of sheets of an absorbent material arranged closely adjacent to and depending from said lower surface.

2. Apparatus for drying wet cans comprising a pad of absorbent material having a supply end and a discharge end, means for rolling the cans along said pad from said supply end to said discharge end, and a plurality of sheets of an absorbent material depending from points closely adjacent to the lower surface of said pad, the number of said sheets per unit length decreasing in the direction from said supply end to said discharge end.

3. Arrangement according to claim 2 including an inclined drainage trough disposed below said sheets and co-extensive therewith.

4. Apparatus for drying wet cans comprising a pad of an absorbent material having a supply end and a discharge end, means of a capillary nature for draining moisture from said pad, and a sequence of relatively short and longitudinally spaced endless belts having runs extending parallel to said pad a predetermined distance apart therefrom and arranged to roll said cans in close contact with said pad from the supply end to the discharge end thereof.

5. Apparatus for drying wet cans comprising a pad of an absorbent material having a supply end and a discharge end, means of a capillary nature arranged at the lower surface of said pad to drain moisture therefrom, a plurality of endless belts having runs extending parallel to and a distance above said pad and arranged to roll said cans from the supply end to the discharge end thereof, and a baffle plate arranged between adjacent ends of each two successive belts.

6. Apparatus for drying wet cans comprising an inclined pad of absorbent material, a plurality of sheets of absorbent material depending from the lower surface of said pad, a sequence of endless belts having runs extending a distance above and parallel to the upper surface of said pad and adapted to roll said cans over said pad from the higher to the lower end thereof, a baffle plate arranged above said pad and interposed between the adjacent ends of each two successive belts, an inclined discharge trough extending below said sheets and longitudinally of said pad, and transversely extending troughs provided at the lower edges of said baffle plates and arranged to discharge into said longitudinal trough.

7. Apparatus for drying wet cans comprising an inclined pad of absorbent material of limited vertical depth, a plurality of sheets of absorbent materials depending from points closely adjacent to the underside of said pad, means disposed above said pad for rolling a procession of said cans over the upper surface of and in close contact with said pad from the upper to the lower end thereof, a blower, a manifold connected to said blower and extending in a direction opposite to the direction of movement of said cans, and branch pipes connected to said manifold and terminating into nozzles adapted to direct air against the end walls of said can procession.

8. Apparatus for drying wet cans comprising a relatively thin pad of absorbent material having an upper and a lower surface, means for rolling cans along said upper surface in close contact therewith, and a plurality of sheets of an absorbent material arranged closely adjacent to and depending from said lower surface, said sheets being of a vertical length of the order of 12 inches.

WELLS A. WEBB.

REFERENCES CITED

The following references are of record in the file of this patent:

UNITED STATES PATENTS

| Number | Name | Date |
|---|---|---|
| 1,279,086 | Davoran | Sept. 17, 1918 |
| 1,447,493 | Strawn | Mar. 6, 1923 |
| 1,555,431 | Murphy | Sept. 29, 1925 |
| 1,688,541 | Goldsworthy | Oct. 23, 1928 |
| 1,991,710 | Stebler | Feb. 19, 1935 |
| 2,142,001 | Minaker et al. | Dec. 27, 1938 |
| 2,410,213 | Herro et al. | Oct. 29, 1946 |